(12) United States Patent
Woolard

(10) Patent No.: US 10,272,887 B2
(45) Date of Patent: Apr. 30, 2019

(54) VEHICLE JACK POSITIONING DEVICE AND METHODS OF MAKING AND USING THE SAME

(71) Applicant: Gary Woolard, Boone, NC (US)

(72) Inventor: Gary Woolard, Boone, NC (US)

(*) Notice: Subject to any disclaimer, the term of this patent is extended or adjusted under 35 U.S.C. 154(b) by 360 days.

(21) Appl. No.: 15/213,481

(22) Filed: Jul. 19, 2016

(65) Prior Publication Data

US 2018/0022326 A1 Jan. 25, 2018

(51) Int. Cl.
| | | |
|---|---|---|
| *B60S 11/00* | (2006.01) | |
| *B23P 6/00* | (2006.01) | |
| *B66F 13/00* | (2006.01) | |
| *B62D 25/20* | (2006.01) | |
| *B66F 3/12* | (2006.01) | |
| *B66F 3/36* | (2006.01) | |

(52) U.S. Cl.
CPC ............ *B60S 11/00* (2013.01); *B23P 6/00* (2013.01); *B62D 25/2081* (2013.01); *B66F 3/12* (2013.01); *B66F 3/36* (2013.01); *B66F 13/00* (2013.01)

(58) Field of Classification Search
CPC ......... B62D 25/2081; B60S 11/00; B23P 6/00
USPC ................................................. 296/1.07, 209
See application file for complete search history.

(56) References Cited

U.S. PATENT DOCUMENTS

| | | |
|---|---|---|
| 4,761,984 A | 8/1988 | Fuscaldo, Jr. |
| 5,027,639 A | 7/1991 | Hinson |
| 5,054,307 A | 10/1991 | Wisner |
| 5,623,846 A | 4/1997 | Brewer, Jr. |
| 6,185,982 B1 | 2/2001 | Ballard et al. |
| 6,722,180 B2 | 4/2004 | Weschler |
| 7,017,384 B2 | 3/2006 | Espinosa |
| 8,132,787 B1 | 3/2012 | Audet |
| 9,302,359 B2 | 4/2016 | Hediger |
| 2003/0019273 A1 | 1/2003 | Weschler |

FOREIGN PATENT DOCUMENTS

| | | |
|---|---|---|
| DE | 102006030769 B3 | 1/2008 |
| DE | 102008012133 A1 | 9/2009 |
| EP | 1291255 A2 | 3/2003 |
| GB | 2089763 A | 6/1982 |

OTHER PUBLICATIONS

EPO, European Search Report of European Patent Application No. 17180911, dated Jan. 16, 2018.

(Continued)

*Primary Examiner* — Dennis H Pedder
(74) *Attorney, Agent, or Firm* — NK Patent Law

(57) ABSTRACT

The presently disclosed subject matter is directed to a device used to facilitate proper positioning of a vehicle jack beneath a vehicle. Particularly, the disclosed device includes a top face comprising a channel that is permanently attached to a vehicle jack point. The disclosed device further includes a bottom face comprising a support member that is releasably coupled to the receiving member on a vehicle jack. The disclosed device therefore enables a user to properly position a vehicle jack on a vehicle, even when conditions are such to prevent adequate inspection. The disclosed device can therefore be utilized in a manner to assure the safe and positive gripping of the vehicle by the jack during use, thus eliminating the hazards associated with improper positioning.

19 Claims, 6 Drawing Sheets

(56) References Cited

OTHER PUBLICATIONS

Floor Jack Adapter—Floor Jack—Bamboo Flooring Installation—Blog.hr, 2011, http://blog.dnevnik.hr/bambooflooringinstallation/2011/10/1629583309/floorjackadapterfloorjack.html.
In a Pinch Weld, Pinch weld jack and lift adapters, http://www.inapinchweld.com/#!page1/c1n4w (accessed May 20, 2016).
PRIUSchat, Made a jack adapter modeled after the oem scissor jack, Apr. 30, 2013, http://priuschat.com/threads/madeajackadaptermodeledaftertheoemscissorjack.125888/.

VEHICLE JACK POSITIONING DEVICE AND METHODS OF MAKING AND USING THE SAME

TECHNICAL FIELD

This presently disclosed subject matter is directed to a device for properly positioning a vehicle jack, and to methods of making and using the same.

BACKGROUND

Vehicle jacks are frequently used to elevate a vehicle to facilitate maintenance and repair activities, such as during the changing of a tire. Virtually all vehicles require the vehicle jack to be positioned relative to and make contact with the vehicle in an optimal spot to allow efficient and safe operation of the jack. However, because the jack point is generally located on the underside of the vehicle frame near the vehicle wheels, the proper position for the jack is often difficult to determine by feel or visual inspection. Often jack operators are guided by only their visual inspection of the vehicle frame, resulting in an imprecise estimate as to the proper jack point. Further, determination of the proper jack point is particularly difficult when jack operation is conducted in the dark, during inclement weather, and/or by an operator not accustomed to frequent use of a vehicle jack. Operation of a jack in an improper position can damage the vehicle and/or cause the vehicle to slip off the jack and expose the operator to physical injury. Accordingly, it would be beneficial to provide a device that can assist the jack operator in determining the proper placement of the vehicle jack relative to the vehicle.

SUMMARY

In some embodiments, the presently disclosed subject matter is directed to a device for permanently attaching to a vehicle. Particularly, the device comprises top, bottom, front, and rear faces. The device further comprises a channel disposed on the top face, wherein the channel is sized and shaped to permanently house a vehicle jack point. In addition, the device includes a support member disposed on the device bottom face and extending downward therefrom, wherein the support member is sized and shaped to be housed within the receiving element of a vehicle jack.

In some embodiments, the presently disclosed subject matter is directed to a method of enabling the proper positioning of a vehicle jack at a jack point on a vehicle. Specifically, the method comprises providing a vehicle comprising a jack point, providing the disclosed device, and providing a vehicle jack comprising a receiving element. The method further comprises permanently attaching the channel to the jack point and coupling the receiving element to the support member, whereby the vehicle jack is properly positioned at the vehicle jack point.

In some embodiments, the presently disclosed subject matter is directed to an assembly comprising a vehicle comprising a jack point and the disclosed device, whereby the device is permanently attached to the jack point through coupling of the channel to the jack point.

DETAILED DESCRIPTION

Figure 1:
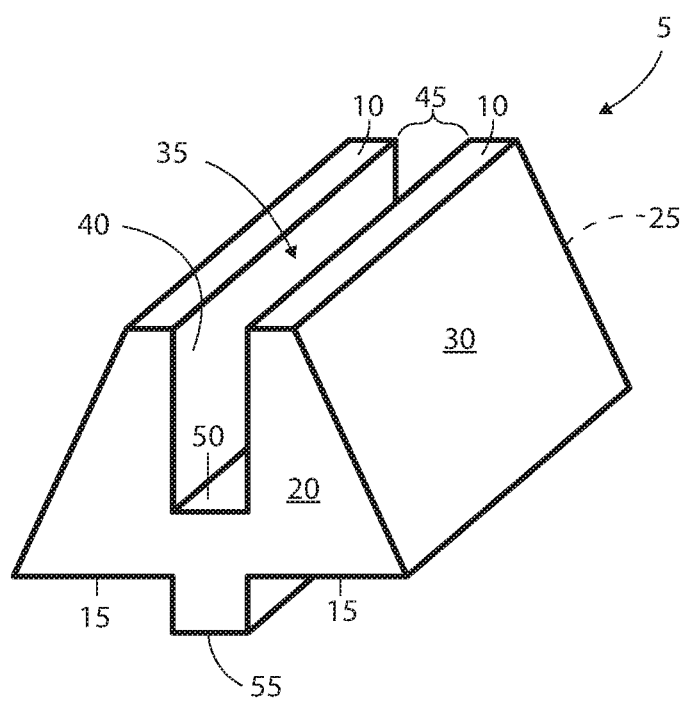
FIG. 1 is a perspective view of a jack positioning device according to some embodiments of the presently disclosed subject matter.

The presently disclosed subject matter will now be described more fully hereinafter with reference to the following description, in which some (but not all) embodiments are shown. The presently disclosed subject matter can, however, be embodied in different forms and should not be construed as limited to the embodiments set forth herein. Rather, these embodiments are provided so that the instant disclosure will be thorough and complete, and will fully convey the scope of the embodiments to those of ordinary skill in the art.

Unless otherwise defined, all technical and scientific terms used herein have the same meaning as commonly understood by one of ordinary skill in the art to which the presently disclosed subject matter pertains. All publications, patent applications, patents, and other references mentioned herein are incorporated by reference in their entireties.

Following long standing patent law convention, the terms "a", "an", and "the" mean "one or more" when used in the subject application, including the claims.

The term "about" as used herein, when referring to a value or to an amount of mass, weight, time, volume, diameter, or percentage is meant to encompass variations of +/−20%, 10%, 5%, 1%, or 0.1% from the specified amount, as such variations are appropriate to perform the disclosed method.

The term "bottom" as used herein refers to a location on the presently disclosed device along the lower surface thereof, as shown in the orientation depicted in the Figures. The bottom face of the disclosed device is the face that includes the support member. The top face is positioned opposite to the bottom face.

The term "channel" as used herein refers to an unfilled space suitable for housing a vehicle jack point.

The terms "comprises" and "comprising" are intended to have the broad meaning ascribed to them in U.S. Patent Law and can mean "includes", "including" and the like.

The term "coupling" as used herein refers to the joining of two elements, either permanently or temporarily.

As used herein, the term "jack point" refers to the proper location on a vehicle where a jack is to make contact with the vehicle during operation of the jack. In some embodiments, the term jack point is the optimal location on the vehicle frame where the jack acts during operation and raising of the vehicle. In some embodiments, the jack point can be a pinch weld.

As used herein, the phrase "permanently attached" refers to an attachment that is not intended to be removed.

As used herein, the term "receiving element" refers to an element of a car jack that houses a support member as set forth herein. For example, in some embodiments, the receiving element can comprise a lock-fit arrangement with the support member, clamps, or other components that releasably grasp the support member, and/or a housing into which the support member is coupled for a desired amount of time.

The term "support member" as used herein refers to an element through which a vehicle jack supports a vehicle. In some embodiments, a support member of the presently disclosed subject matter can be coupled to a vehicle jack to raise and/or lower the vehicle.

The term "top" as used herein refers to a location on the presently disclosed device along the upper surface thereof as seen in the orientation shown in the Figures. The top face of the disclosed device is the face that includes the channel. The top face is positioned opposite to the bottom face.

The term "vehicle" as used herein refers to any motorized or other structure likely to travel, such as cars, vans, buses, trucks, motorcycles, off-road recreational vehicles, tractors, and the like.

As used herein, the term "vehicle jack" or "jack" refers to any type of apparatus used to raise, lower, level, or support a vehicle. In some embodiments, the vehicle jack can include (but is not limited to) a crank jack, electric jack, hydraulic jack, trailer tongue jack, scissors-type jack, screw-type jack, and the like.

The presently disclosed subject matter is directed to a device used to enable proper positioning of a vehicle jack underneath a vehicle. Particularly, FIG. 1 illustrates a jack positioning device in accordance with some embodiments of the presently disclosed subject matter. Specifically, device 5 includes top face 10 (which functions as the vehicle-engaging face of the device), bottom face 15 (which functions as the jack-engaging face of the device), front face 20, rear face 25, and sides 30. In some embodiments, device 5 is disposed in a generally upright position, with bottom face 15 facing downwards and top face 10 facing upwards. In some embodiments, top face 10 and bottom face 15 are disposed about parallel to each other. In some embodiments, front face 20 and rear face 25 are disposed about parallel to each other. In some embodiments, the front face is disposed about perpendicularly to the top face and/or bottom face. In some embodiments, the rear face is disposed about perpendicularly to the top face and/or bottom face.

Top face 10 comprises channel 35 comprising inner surface 40, top channel opening 45, and bottom partition 50, opposite to the top channel opening. In some embodiments, the channel can span the distance between the front and rear faces, as shown in FIG. 1. In some embodiments, the channel is of a uniform width. However, in some embodiments, the width of channel 35 can taper to accommodate a variety of jack points of varying widths. Channel 35 is configured to receive a vehicle jack point. In some embodiments, the vehicle jack point comprises a width and depth that is approximately the same width and depth as channel 35, such that the jack point is capable of fitting closely into the channel.

Thus, channel 35 can be configured in any desirable shape to cooperate with a vehicle jack point, including (but not limited to) a circular, rectangular, square, oblong, etc. cross-section. In some embodiments, channel 35 and the vehicle jack point have the same cross-sectional size and/or shape. Thus, channel 35 is sized and shaped to be affixed to a vehicle jack point (i.e., the jack point fits into the channel and is permanently maintained in position). In some embodiments, the channel extends substantially perpendicularly to the front and/or rear faces of the device. It should be appreciated that channel 35 can be configured to allow device 5 to be adapted for use on all types of vehicles, without limitation.

Bottom face 15 of device 5 comprises support member 55 that projects away from bottom face 15 (i.e., outward from the device) and is adapted to cooperate with a vehicle jack. In some embodiments, the support member is approximately centrally located on bottom face 15, i.e., about equidistant from sides 30. In some embodiments, support member 55 extends from front face 20 to rear face 25 on bottom face 15. In some embodiments, the support member is positioned perpendicularly to the bottom face of the device. The support member cooperates with the receiving element of a vehicle jack. It should be appreciated that support member 55 provides the support structure for the vehicle jack. Particularly, the support member is at least partially or fully contained within a vehicle jack receiving element. In some embodiments, support member 55 can include a nonslip or friction-resistant coating applied to the surface to maintain engagement with the vehicle jack. Such coatings are well known to those of ordinary skill in the art.

Support member 55 can be configured in any desirable shape to cooperate with the receiving element of a vehicle jack, including (but not limited to) a rectangular, square, oblong, etc. cross-section. In some embodiments, support member 55 and the receiving element have about the same cross-sectional size and/or shape. Thus, support member 55 can be sized and shaped to be coupled with the receiving element of a vehicle jack. It should be appreciated that support member 55 can be configured to allow device 5 to be adapted for use with all types of vehicle jacks, without limitation.

Sides 30 of device 5 can be shaped in any way desired. For example, in some embodiments, the device can include sloped sides spanning the distance between top face 10 and bottom face 15, as illustrated in FIG. 1. Thus, in some embodiments, sides 30 can comprise an angle of no more than (or no less than) about 5, 10, 15, 20, 25, 30, 35, 40, 45, 50, 55, 60, 65, 70, 75, 80, 85, 90, 95, 100, 105, 110, 115, 120, 125, 130, 135, 140, or 145 degrees, relative to top face 10 and/or bottom face 15. However, it should be appreciated that sides 30 are not required to be angled and can be configured in any shape known in the art. Similarly, it should be appreciated that the shape of device 5 is not limited and can be configured in any form desired, so long as the device includes channel 35 and support member 55. Further, the size of device 5 is not limited. For example, in some embodiments, the device can have dimensions of about 2 inches×2 inches×2 inches (length×width×height).

Figure 2A:
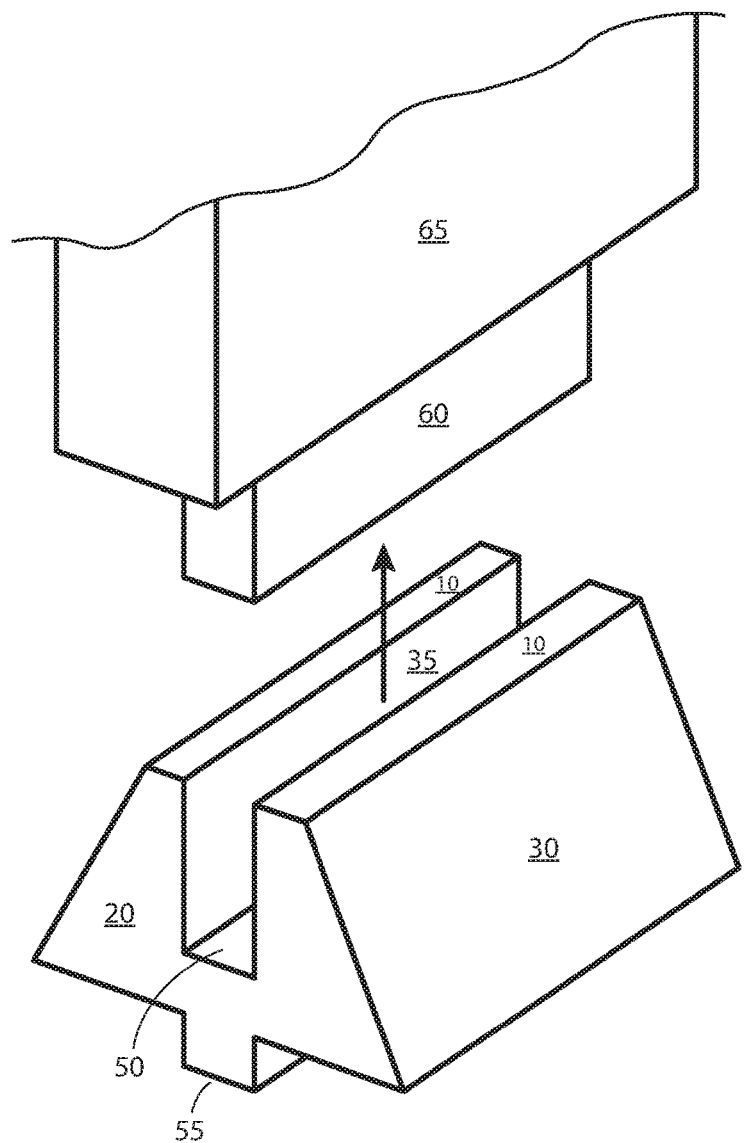
FIGS. 2a and 2b are perspective views of the device of FIG. 1 in use in accordance with some embodiments of the presently disclosed subject matter.
Figure 2B:
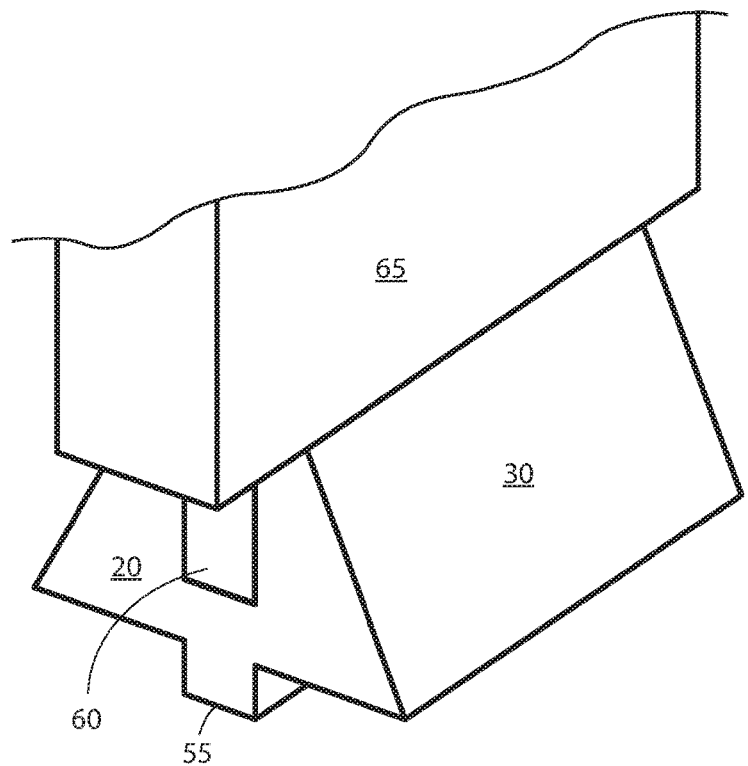

As illustrated in FIGS. 2a and 2b, device 5 is mated with vehicle 65 such that channel 35 and vehicle jack point 60 are disposed in an abutting and aligned relationship relative to one another (i.e., channel 35 is sized and shaped to house jack point 60, which can be a protruded element sized and shaped to fit into the channel). Particularly, as shown in FIG. 2a, device 5 and the vehicle are aligned such that jack point 60 is positioned above channel 35. The device can then be elevated until the jack point is housed within channel 35. In some embodiments, channel 35 has a diameter that is slightly greater than the outer diameter of jack point 60 such that the jack point freely but closely fits into the channel. Once in position (FIG. 2b), device 5 (via channel 35) can be permanently attached to the vehicle jack point using any method known in the art, including (but not limited to) adhesive bonding, welding, mechanical fasteners (i.e., bolting, riveting, clamping, etc.), engaging by fit and shape, and the like to ensure that the channel remains permanently positioned on vehicle jack point 60. For example, if an adhesive is utilized, it can be applied along channel interior 40 and/or channel bottom partition 50 to engage vehicle jack point 60 and secure the device to the vehicle. Once channel is 35 attached to the vehicle jack point, device 5 is at the proper position for coopering with a vehicle jack to raise and/or lower the vehicle. Further, once device 5 is attached to the vehicle jack point, a user can properly position a vehicle jack to the vehicle, even when conditions are such to prevent any adequate inspection. Device 5 can therefore be utilized in a manner to assure the safe and positive gripping of the vehicle by the jack during the elevating process, thus eliminating the hazards associated with improper positioning of the jack.

Figure 3A:
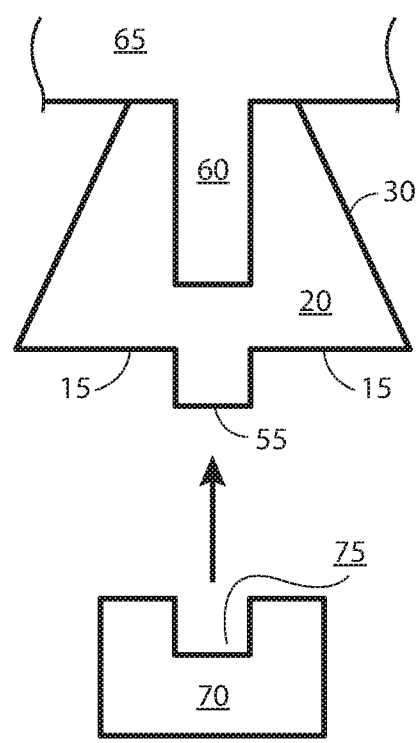
FIGS. 3a-3c are front elevation views of the device of FIG. 1 in use in accordance with some embodiments of the presently disclosed subject matter.
Figure 3B:
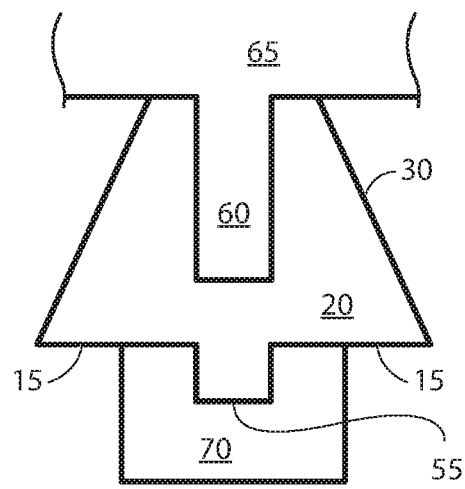

As shown in FIGS. 3a and 3b, jack 70 can be positioned below bottom face 15 of device 5 to be in proper position to raise and lower the vehicle. Specifically, a selected vehicle jack 70 is placed underneath vehicle 65, such that jack receiving element 75 is positioned at a location below and aligned with support member 55, as illustrated in FIG. 3a. The operator will then raise the jack until receiving element 75 engages support member 55. In some embodiments, the support member is sized and shaped to cooperate with the receiving element of the jack, such that the support member is capable of fitting closely into the receiving element. In some embodiments, support member 55 and receiving element 75 have about the same cross-sectional size and/or shape. Thus, the support member is sized and shaped to be housed within the receiving element of the jack. It should be appreciated that the support member is releasably housed in the receiving element of the jack such that a user can easily couple and uncouple the support member on demand.

Figure 3C:
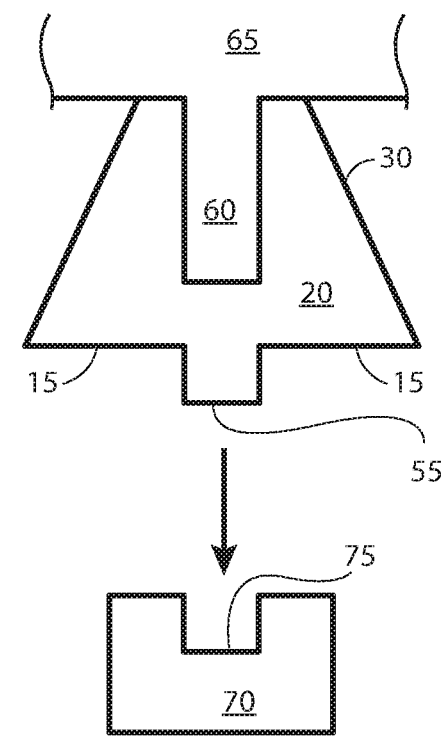

Thus, support member 55 is received and retained within receiving element 75 of jack 70 and is held in position for a desired amount of time (i.e., while the vehicle is raised, until the vehicle has been lowered, etc.). In this manner, the disclosed device prevents damage to vehicles caused by supporting the vehicles in non-approved jacking locations. Once the vehicle has been lowered, the jack can be detached from support member 55 via uncoupling the support member and the receiving element, as shown in FIG. 3c.

Therefore, device 5 ensures proper positioning of a vehicle jack underneath a vehicle and ensures effective engagement with the appropriate part of the framework of the vehicle. Further, the device provides, among others, the advantages of increasing the degree of stability of the jack, reinforcing the jack at mechanically critical parts of the vehicle, and making it easier for the user to initially install the jack under the vehicle body.

Device 5 can be constructed from any material known in the art to be rugged and durable, thereby ensuring many years of intended usage. The material used to construct device 5 should be capable of withstanding the force applied upon contact of the jack. Therefore, in some embodiments, device 5 can be constructed from metal, polymeric material, combinations thereof, and the like, as would be known in the art. For example, in some embodiments, the device can be constructed from a lightweight but high-strength metal, such as (but not limited to) aluminum, titanium, and/or alloys or combinations thereof. In some embodiments, the device can include bright colors and/or glow-in-the-dark areas (such as on and/or around support member 55 or bottom face 15) to assist users in correctly positioning the jack. Device 5 can be constructed using any of a wide variety of techniques, including (but not limited to) welding, injection molding, gas-assisted injection molding, extrusion, reaction-injection molding, slush molding, pour molding, blow molding, and/or casting using any of the materials described above.

The presently disclosed device is therefore relatively inexpensive to manufacture due to its simplicity of construction. It should be appreciated that device 5 can be manufactured and installed as part of the original equipment of the vehicle, or can be readily attached to the vehicle later as an accessory item with a minimum of time and labor involved.

What is claimed is:

1. A device for permanently attaching to a vehicle jack point of a vehicle, the vehicle jack point being of the type that is a vertically downwardly extending flange formed from a pinch weld, said device comprising:
    a. a top face and a bottom face;
    b. a front face and a rear face;
    c. an elongate channel disposed within the top face and extending from the front face to the rear face, wherein the channel is sized and shaped to permanently house a vehicle jack point of a vehicle, wherein the channel is defines a pair of parallel facing walls along the entire length thereof to form a pocket for being permanently affixed to the vehicle jack point; and
    d. a support member disposed on the bottom face and extending downward therefrom, wherein the support member is sized and shaped to be housed within the receiving element of a vehicle jack,
    e. wherein the pocket is sized to engage the vehicle jack point by having a width dimension that is about equal to a width dimension of the vehicle jack point,
    f. wherein the device is permanently attached to the vehicle jackpoint,
    g. wherein the device remains permanently attached to the vehicle even when the device is not engaged with a jack.

2. The device of claim 1, wherein the top face and the bottom face are disposed parallel to each other, or the front face and the rear face are disposed parallel to each other, or both.

3. The device of claim 1, wherein the vehicle jack point is a vehicle pinch weld.

4. The device of claim 1, wherein the channel and the vehicle jack point have about the same cross-sectional size and shape.

5. The device of claim 1, wherein the vehicle is selected from a car, truck, bus, or van.

6. The device of claim 1, wherein the support member comprises a nonslip or friction-resistant coating.

7. The device of claim 1, wherein the support member is approximately centrally located on the bottom face.

8. The device of claim 1, wherein the device is constructed from metal, a polymeric material, or combinations thereof.

9. The device of claim 8, wherein the device is constructed from a material comprising aluminum, titanium, alloys of aluminum, alloys of titanium, or combinations thereof.

10. A method of enabling the proper positioning of a vehicle jack at a jack point on a vehicle, said method comprising the steps of:
    a. providing a vehicle comprising a jack point;
    b. providing the device of claim 1;
    c. permanently attaching the channel to the jack point;
    d. providing a vehicle jack comprising a receiving element; and
    e. coupling the receiving element to the support member; whereby the vehicle jack is properly positioned at the vehicle jack point.

11. The method of claim 10, when the vehicle is selected from a car, truck, bus, or van.

12. The method of claim 10, wherein the vehicle channel is permanently attached to the jack point using an adhesive, welding, mechanical closures, or combinations thereof.

13. The method of claim 10, wherein the device channel extends from the front face to the rear face.

14. The method of claim 10, wherein the vehicle jack point is a vehicle pinch weld.

15. The method of claim 10, wherein the device channel and the vehicle jack point have about the same cross-sectional size, shape, or both.

16. The method of claim 10, wherein the vehicle support member comprises a nonslip or friction-resistant coating.

17. The method of claim 10, wherein the support member is approximately centrally located on the bottom face.

18. The method of claim 10, wherein the device is constructed from metal, polymeric material, or combinations thereof.

19. The device of claim 1, wherein the device is permanently attached to the vehicle jackpoint by applying the adhesive to the pocket.

\* \* \* \* \*